United States Patent
Zhang et al.

(10) Patent No.: US 7,660,240 B2
(45) Date of Patent: Feb. 9, 2010

(54) METHOD OF ACHIEVING THE NETWORK LINK STATUS PENETRATE

(75) Inventors: Hongxing Zhang, Shenzhen (CN); Yuxiang Wang, Shenzhen (CN); Jianfei He, Shenzhen (CN); Zuoxiao Ma, Shenzhen (CN); Bo Liang, Shenzhen (CN)

(73) Assignee: Huawei Technologies Co., Ltd., Shenzhen Guangdong (CN)

( * ) Notice: Subject to any disclaimer, the term of this patent is extended or adjusted under 35 U.S.C. 154(b) by 618 days.

(21) Appl. No.: 10/535,858

(22) PCT Filed: Aug. 13, 2003

(86) PCT No.: PCT/CN03/00668

§ 371 (c)(1),
(2), (4) Date: Feb. 3, 2006

(87) PCT Pub. No.: WO2004/047366

PCT Pub. Date: Jun. 3, 2004

(65) Prior Publication Data

US 2006/0215570 A1      Sep. 28, 2006

(30) Foreign Application Priority Data

Nov. 21, 2002   (CN)   ................. 02 1 52531

(51) Int. Cl.
*G01R 31/08*   (2006.01)
(52) U.S. Cl. ..................... 370/229; 370/230
(58) Field of Classification Search ............... 379/1.01, 379/22, 22.03; 370/351, 355, 356, 389, 395.1, 370/395.2, 395.21
See application file for complete search history.

(56) References Cited

U.S. PATENT DOCUMENTS

| 6,032,266 | A  | * | 2/2000 | Ichinohe et al. | ................. 714/9 |
| 7,058,027 | B1 | * | 6/2006 | Alessi et al. | ............. 370/310.1 |
| 7,234,001 | B2 | * | 6/2007 | Simpson et al. | ............. 709/239 |
| 2001/0043560 | A1 | * | 11/2001 | Liu et al. | ..................... 370/216 |
| 2002/0078232 | A1 | * | 6/2002 | Simpson et al. | ............. 709/238 |
| 2003/0058106 | A1 | * | 3/2003 | Ikematsu | ................. 340/568.1 |
| 2003/0189946 | A1 | * | 10/2003 | Yajnik et al. | ................. 370/428 |

FOREIGN PATENT DOCUMENTS

| CN | 1340928 | 3/2002 |
| JP | 8-202824 | 8/1996 |
| JP | 08-331139 | 12/1996 |
| JP | 10-051477 | 2/1998 |
| JP | 2001-189738 | 7/2001 |

* cited by examiner

*Primary Examiner*—Chi H Pham
*Assistant Examiner*—Fan Ng
(74) *Attorney, Agent, or Firm*—Darby & Darby P.C.

(57) ABSTRACT

The invention discloses a method for implementing link state passing-through in network, for informing the peer of link fault, including: the service device detecting whether there is a link fault in the network; in case of link fault, the service device transferring link fault information to peer service device with a control frame; in response to the control frame containing link fault information, the peer service device disconnecting the user's link and performing corresponding processes; the user at the faulty peer communicating with peer user through the spare network; when the link recovers to normal, the service device at the recovery peer sending a control frame containing link fault recovery information to peer service device to reestablish communication between the users on the link. The invention is capable of reducing extra overhead under normal network conditions as much as possible.

13 Claims, 5 Drawing Sheets

Δt1 < T0  Deem the link as normal
Δt2 >= T0  Deem the link as faulty

METHOD OF ACHIEVING THE NETWORK LINK STATUS PENETRATE

CLAIM OF PRIORITY

This application is a U.S. national phase application under 35 U.S.C. §371 of International Patent Application No. PCT/CN03/00668 filed Aug. 13, 2003, and claims the benefit of priority of CN Patent Application No. 02152531.5 filed Nov. 21, 2002. The International Application was published in the Chinese language on Jun. 3, 2004 as WO 2004/047366.

FIELD OF THE INVENTION

The present invention relates to network communication, in particular to a method for implementing passing-through of access point link state and service link state in point-to-point access network.

BACKGROUND OF THE INVENTION

In engineering applications, the data between users enters into the network via access devices, in order to implement data interaction. FIG. 1 is a schematic diagram of data interaction by user through a point-to-point access network. As shown in FIG. 1, under normal conditions, user 1 and user 2 establish communication with each other through service devices and links; said links mainly comprise access point link 1, service network, and access point link 2. In case the links are faulty, i.e., either the access point links or the service network are faulty, the communication between user 1 and user 2 will be interrupted. For important users, in case of such faults, the spare network has to be initiated to ensure normal transmission of important data. The spare network may be in any form, e.g., an additionally leased link, or a wireless communication or satellite communication link established between user 1 and user 2. In case the access point link is faulty, the user can detect link fault and initiate the spare network, trying to communicate with the remote user through the spare network. However, at that time, the remote user does not know the link fault and still communicates through the original network; as a result, the communication between the two users will be in a disconnecting state. In case the service network is faulty, neither of the users knows the network is out of service; as a result, the communication will be disconnected. If the link state can be delivered to the remote user, i.e., link state passing-through function can be achieved, the remote user can initiate the spare network and reestablish the linking with user 1 or user 2 through the spare network.

There are diverse ways to inform the remote user of link fault. A typical method is: user 1 and user 2 inform the linking information at the local to remote peer through periodical peer-to-peer inform; in case there is no linking information sent from the remote user for long, it indicates the link is faulty; in that case, the user stops the peer-to-peer inform of linking information and automatically initiates the spare network to communicate. Another typical method is: user 1 and user 2 detect the using of the spare network in real time; as long as the using of the spare network is detected, the other party will also switch to the spare network.

Though above methods can solve the problem to a certain degree, they have some drawbacks: first, normally the periodical peer-to-peer inform of linking information will occupy network bandwidth and result extra network overhead; second, in case of network congestion, the peer-to-peer inform of linking information will be delayed and may result in misoperation due to a wrong judgment; third, detection of the spare network will occupy some bandwidth of the spare network and result in extra overhead of the network; fourth, when the links recover to normal, it is a trouble that how the two users leave the spare network and return to the working network.

SUMMARY OF THE INVENTION

To overcome above drawbacks in prior art, the present invention provides a method for implementing link state passing-through in the network, which is capable of informing remote peer of link fault and reducing extra overhead during normal network operation as much as possible.

To attain above object of the present invention, there is provided a method for implementing link state passing-through in the network comprising: the service device detecting whether the link in the network is faulty; if the link is faulty, the service device transmitting link fault information to the remote service device with a control frame; in response to the received control frame containing link fault information, the remote service device disconnecting the user's link and performing corresponding processes; and the user at the faulty peer communicating with the remote user through the spare network.

The method described in the present invention also comprises the following step:

When the said link recovers to normal, the service device at the recovering peer sends a control frame containing link fault recovery information to the remote service device, and reestablishes the communication between said users through said link.

Control frame contains at least network state information, which indicates whether there is a link fault. Control frame may be a standard Ethernet frame, with said network state information filled in the operation code field of said standard Ethernet frame; an encapsulation protocol control frame, with said network state information filled in the control field of said encapsulation protocol control frame; or a signal label byte, with said network state information filled in it.

Said step of detecting link fault further comprises the following steps for de-dithering treatment:

judging the link is faulty only when the link is unavailable for a predefined time period; and judging the link recovers to normal only when the link is available for a predefined time period.

If said link fault is an access point fault, the service device at the faulty peer sends a control frame containing access point fault information to the remote service device; when receiving said control frame containing access point fault information, said remote service device disconnects the connection with the remote user; and then, the user at the faulty peer communicates with the remote user through the spare network;

if said link fault is a service network fault, the service device at the faulty peer sends a control frame containing service network fault information to the remote service device and disconnects the link with the user at the faulty peer; when receiving said control frame containing service network fault information, said remote service device disconnects the connection with the remote user; and then the user at the faulty peer communicates with the remote user through the spare network.

In case the link fault is a service network fault, the processing steps corresponding to the service network fault are performed only after determining the protection function of said service network per se fails.

The present invention has the following benefits: 1) when the link works normally, no control frame will be sent for controlling, and thereby the bandwidth of the working network and the spare network will not be occupied, reducing extra overhead; 2) utilizing the control frame mechanism to control link disconnection and recovery has no side effect to the original network, and thereby facilitates network upgrade and maintenance; 3) in the present invention, "de-dithering" treatment is used for judgment of link fault and recovery, enhancing network's reliability and ease of use.

DETAILED DESCRIPTION OF THE EMBODIMENTS

Figure 2:
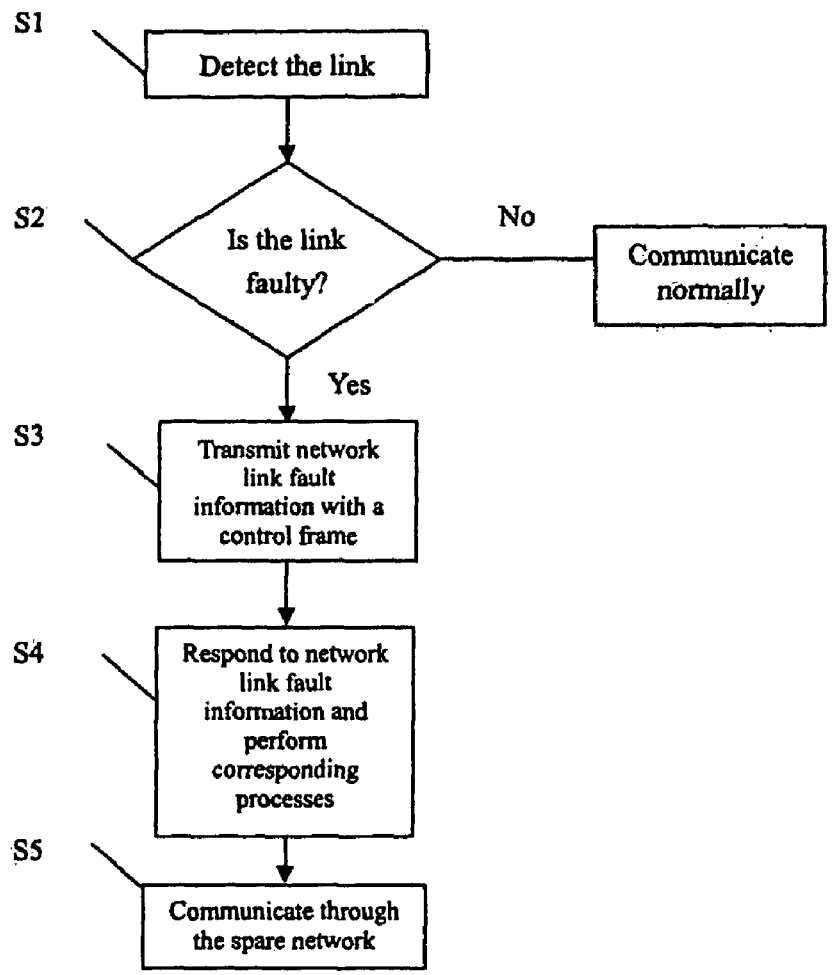
FIG. 2 is a flow block diagram of the method for link state passing-through as described in the present invention.

FIG. 2 is a general technical flow diagram of the method for link state passing-through as described in the present invention. As shown in FIG. 2, first, the service device detects whether the link in the network is faulty S1; if the link is faulty S2, the service device at the faulty peer transfers a link fault information to the remote service device through the service network with a control frame S3; when receiving the control frame from said service device, the remote service device performs corresponding processes S4; then, the user at the faulty peer communicates with the remote user through the spare network S5.

Control frame may be defined in different ways. Hereunder 3 ways are introduced.

Figure 8:
FIG. 8 is a schematic diagram showing the composition of a control frame as described in an embodiment of the present invention.

(1) Define a Control Frame Using a Standard Ethernet Frame and Implement Link State Passing-Through Function In an IP OVER SDH network, a user is an Ethernet switch, and a service device is a SDH Ethernet access device. First, the control frame shown in FIG. 8 is defined in an Ethernet frame format; the control frame comprises:

Destination address (6 bytes): globally unique Media Access Control (MAC) address;

Source address (6 bytes): globally unique MAC address;

Type field (2 bytes): 0xE140—indicates the frame is a control frame for link state passing-through function;

Operation code field (2 bytes):
0x0000—network fault disappears (Non_Broken message),
0x0200—network is faulty (Broken message);
Padding field (44 bytes): filled with padding bytes;
Check field (4 bytes): filled with cyclic redundancy Crc32 check value of Ethernet.

Second, several time parameters are defined; for reference, T0=500 ms, T1=1~5 s, T2=5~10 s, T3=20 ms~1 s, and T4= 30 s~300 s can be used.

After the control frame format and time parameters are defined, the service device detects working condition of the service network and linking condition of the access point link, and carries out control as described above, to implement link state passing-through function.

In view that the faulty points are sometimes needed to be distinguished in network maintenance to facilitate the network maintenance, the operation code field shall be extended. The extended operation codes are defined as:

0x0000—access point fault disappears (Non_Broken message),
0x0100—service network fault disappears (Non_Broken message),
0x0200—access point is faulty (Broken message);
0x0300—service network is faulty (Broken message);

When the faulty peer detects an access point fault, it will send an access point fault message; if it detects a service network fault, it will send a service network fault message. The device can choose whether to support extended operation codes or not.

(2) Use Encapsulation Protocol Control Frame to Implement Link State Passing-Through Function When encapsulation protocol is used to implement link state passing-through function, a control field in encapsulation protocol can be used to define the control frame. If link access regulation-SDHLAPS/Peer-to-Peer Protocol PPP/ High Digital Link Control HDLC encapsulation protocol is used, the control field can be defined as follows:

0x70—network fault disappears (Non_Broken message),
0x72—network is faulty (Broken message);

Normally, the control field is filled with the default control value. In case of link fault, the device at the faulty peer will fill a control value with above special meaning into the control field, to inform the remote device of the current link state. When the remote device receives the control value that represents link fault, it will carry out treatment according to the control value. When the link recovers, the device will send normal control value.

Similarly, the device may choose to use extended control values; the extended control field is defined as follows:

0x70—access point fault disappears (Non_Broken message), 0x71—service network fault disappears (Non_Broken message), 0x72—access point is faulty (Broken message), 0x73—service network is faulty (Broken message);

(3) In SDH, Use Signal Label Byte to Implement Link State Passing-Through Function The signal label is defined in particular as follows:
0x70—network fault disappears (Non_Broken message),
0x72—network is faulty (Broken message);

The extended definition is as follows:
0x70—access point fault disappears (Non_Broken message), 0x71—service network fault disappears (Non_Broken message), 0x72—access point is faulty (Broken message), 0x73—service network is faulty (Broken message);

In SDH, the signal label is transmitted using byte C2/V5 in channel overhead.

For VC3/VC4 level services, normally byte C2 is used to transmit the normal value of signal label. In case of link fault, the device at fault detection peer will transmit link fault C2 value to inform the remote device of the current link state. When the remote device receives byte C2 representing link fault, it should not send a signal mismatch alarm; instead, it shall execute link state passing-through function and carry out state transfer according to the state machine of the link state passing-through function. After the link at the faulty peer recovers and the device returns to normal working state, the device will resend normal C2 value.

For VC1/2 level services, byte V5 is used to transmit a control frame for link state passing-through function, with the working mechanism identical to that for VC3/VC4 level services. It is to be noted that normally bits 5~7 in byte V5 is used to transmit the normal signal label. Since the link state passing-through function is added, byte V5 is needed to be used extensively. According to the standard, when extensively used, bits 5~7 in byte V5 is filled with 101, and the extended signal label is filled into bit 1 in byte K4; the bits 1 in K4 of 32 frames constitute a 32 bit string, using bits 12~19 to transmit the extended signal label.

1. Link State Passing-Through in Access Point Fault Mode

Figure 3:
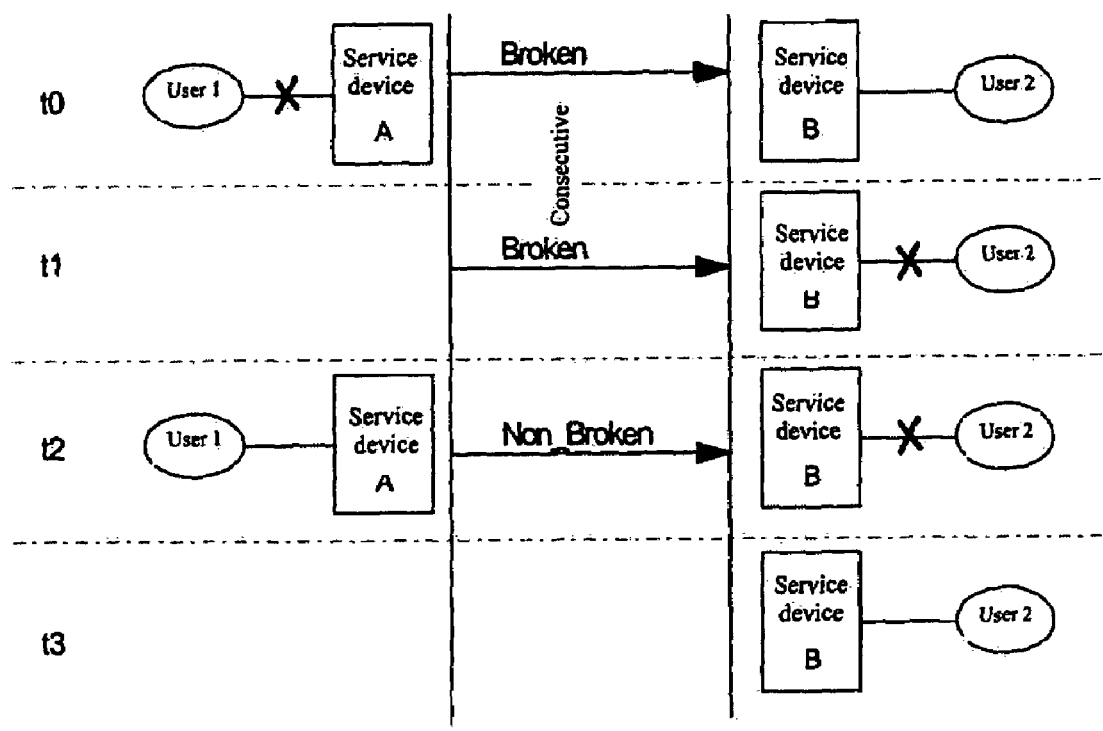
FIG. 3 is a process diagram of link state passing-through in standard mode as described in an embodiment of the present invention.

FIG. 3 is a process diagram of link state passing-through in standard mode as described in an embodiment of the present invention; as shown in FIG. 3, the processing steps are as follows:

At t0, the link between user 1 and service device A is faulty. Service device A sends consecutive Broken primitives to the remote service device B, informing service device B of the link fault at the local; the primitives is in control frame format.

At t1, service device B receives the link fault Broken primitives; after processing it, service device B knows link is faulty at service device A and thereby disconnects the link with user 2; the linking state of link between user 1 and service device A passes-through to the linking state of link between service device B and user 2. At this time, user 1 and user 2 can use the spare network to communicate with each other.

At t2, the link between user 1 and service device A is recovered; at this time, service device A sends Non_Broken primitive to service device B, informing service device B of the link recovery at the local.

At t3, service device B receives the Non_Broken primitive; after processing it, service device B knows the link fault at service device A has been eliminated, and thereby reestablishes the link with user 2 in the original network.

2. Link State Passing-Through in Service Network Fault Mode

Figure 4:
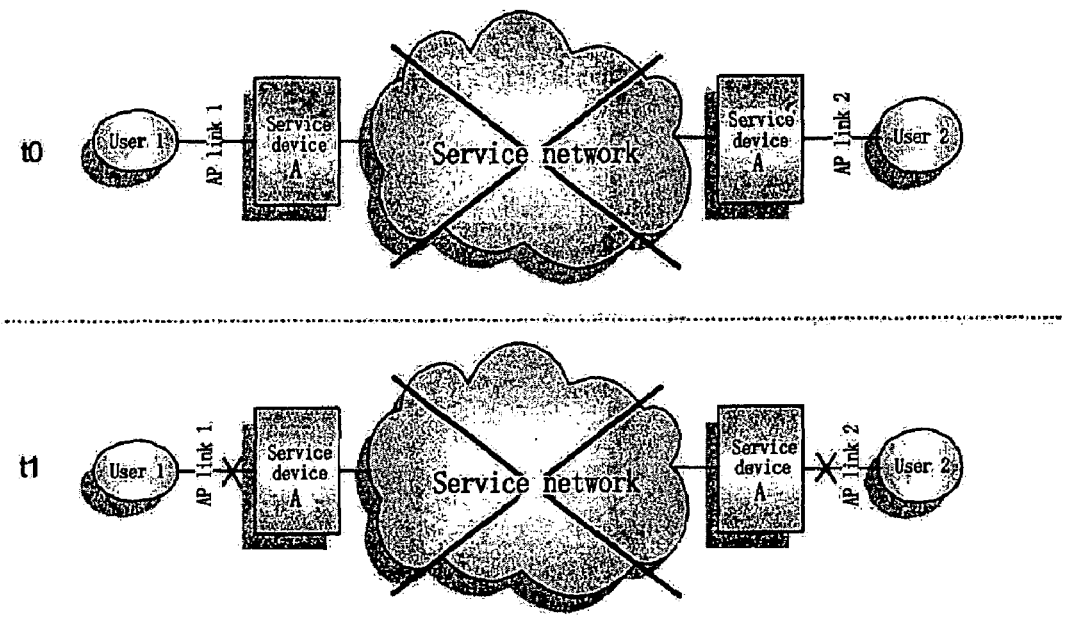
FIG. 4 is a process diagram of link state passing-through in extended mode as described in an embodiment of the present invention.

FIG. 4 is a process diagram of link state passing-through in extended mode as described in an embodiment of the present invention; as shown in FIG. 4, the processing step are as follows:

At t0, service device A detects the service network is unavailable, and sends Broken primitive to the remote peer and disconnects the link with the user at the local;

At t1, service device receives the Broken primitive and then disconnects the link with user 2; after that, user 1 and user 2 use the spare network to communicated with each other, till the service network is recovered.

It is noted that the service network usually has its own network protection function, having certain network protection capability. To avoid disorder, the link state passing-through function is required to be initiated late, i.e., initiated only after the protection function of the service network is determined as faulty.

3. De-Dithering Treatment of Link State Passing-Through Function

Figure 5:
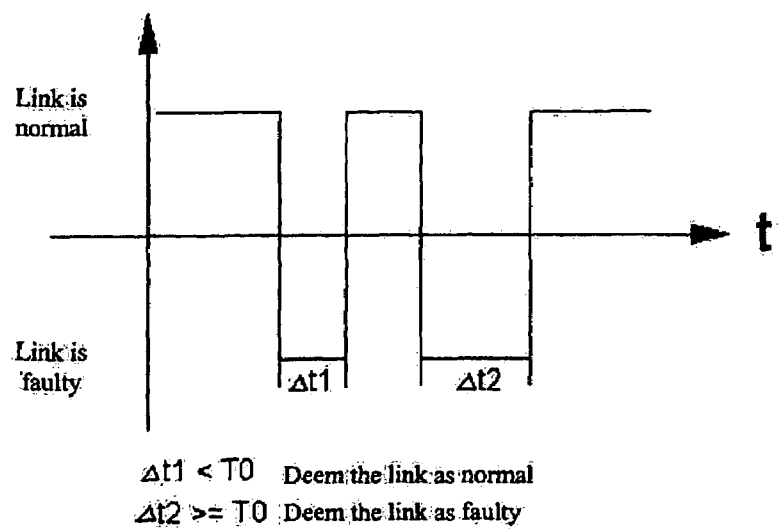
FIG. 5 is a timing diagram of de-dithering treatment as described in an embodiment of the present invention.

In implementation of the link state passing-through function, misoperation may occur if the link state is not stable (dithering). In order to eliminate link dithering, de-dithering treatment may be carried out. FIG. 5 is the timing diagram of de-dithering treatment as described in an embodiment of the present invention; as shown in FIG. 5, the major processing steps are:

judging the link as faulty only when the link is unavailable for a period of time T0; if the link fault duration is less than T0, keeping the original link state;

judging the link as normal only when the link is available for a period of time T0.

Figure 6:
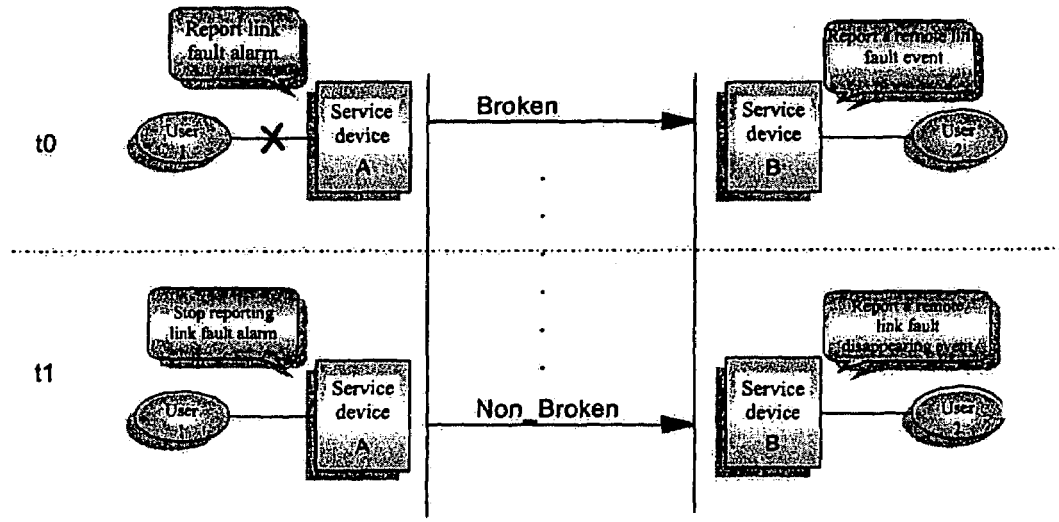
FIG. 6 is a diagram of alarm and event reporting as described in an embodiment of the present invention.

4. Alarms and Events During Implementation of the Link State Passing-Through Function During the link state passing-through process, various situations shall be monitored and reported. FIG. 6 shows the alarms and events during implementation of the link state passing-through function; as shown in FIG. 6, the main contents are:

☐. when the service device detects access point link fault, it reporting an access point fault alarms; it stopping alarm reporting only when it detects the access point link fault disappears;

☐. when the service device receives the Broken control frame for the first time, it reporting a remote peer link fault event; similarly, when receiving the Non_Broken control frame for the first time, it reporting a remote peer link fault disappearing event;

☐. when the service device detects service network fault, it reporting the event with an existing alarm in the service network or with a special alarm.

5. State Machine Transfer of Link State Passing-Through Function

Figure 7:
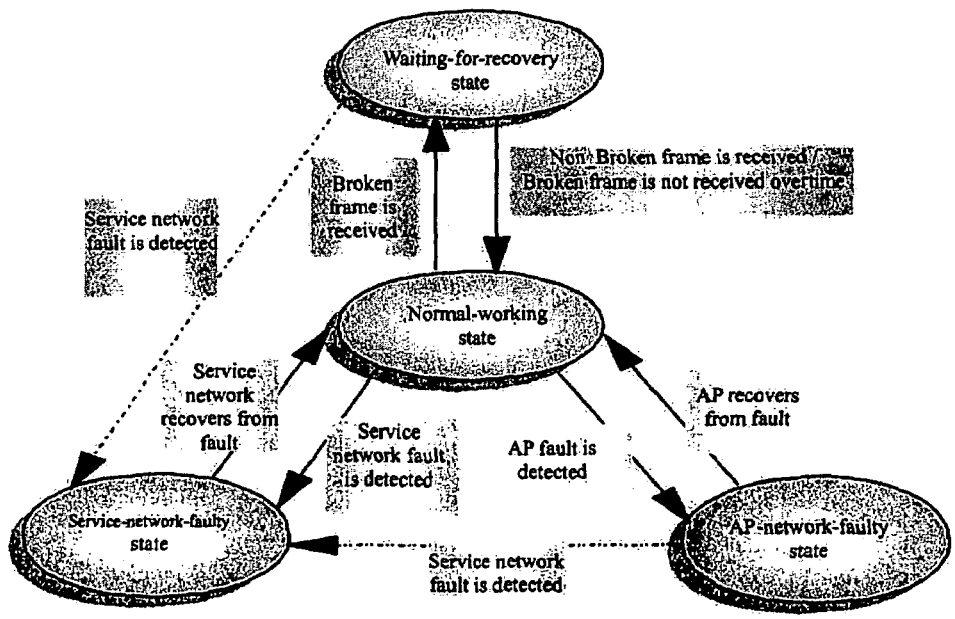
FIG. 7 is a diagram showing the state transition implemented through link passing-through as described in an embodiment of the present invention.

There are many states for the link state passing-through function. As the link conditions change, those states can transfer between each other. Hereunder the various states and their transfer for link state passing-through function are detailed, with reference to FIG. 7. FIG. 7 is a state transition diagram implemented with the link passing-through function as described in an embodiment of the present invention; as shown in FIG. 7, the detailed implementation steps of link state passing-through function consist of a state machine with 4 basic states; said 4 basic states are defined as follows:

Normal-working state: both the access points and the service network are in normal state;

Waiting-for-recovery state: after the service device receives Broken control frame, it enters into waiting-for-recovery state;

Access-point-faulty state: the path between a user and the service device is faulty, and normal communication between the user and the service device could not be performed;

Service-network-faulty state: the service network between the service devices is faulty, and normal communication could not be performed.

The state transition process is summarized as follows:

Normal-working state:

1) If detecting the service network is unavailable for a period of time T0, a device will send Broken control frame to the remote device, informing the remote device that the local has detected the service network is unavailable, and then enter into service-network-faulty state;

2) If detecting the access point network is unavailable for a period of time T1, the device will send Broken control frame to the remote device, informing the remote device that the local has detected the access point network is unavailable, and then enter into access-point-faulty state;

3) If receiving Broken control frame, which indicates the local network is faulty, the local service device will disconnect linking with the user, and then enter into waiting-for-recovery state;

Waiting-for-recovery state: if a device enters into this state, it is indicated that the device has received Broken control frame. In that case, the access point network at the local may be normal; therefore, linking to the access point network should not be tried.

1) If the device detects that the service network is unavailable for a period of time T0, it will send Broken control frame to the remote device, informing the remote device that the local has detected the service network is unavailable, and then enter into service-network-faulty state; this step is optional;

2) The device disconnects the link with the user in a time interval T1, to avoid an accident in which the service device does not disconnect the link to the user; if it can be ensured that the linking between the device and the user's access point disconnected before entering into waiting-for-recovery state, this step is also optional;

3) If the device has not received Broken message for a period of time T2, it is possible that the remote peer has entered into normal-working state or waiting-for-recovery state; in that case, the device at the local should link the access point link with the user and return to normal-working state actively, to avoid deadlock;

4) If the device receives Non_Broken control frame, which indicates the remote peer has recovered from the link fault to normal-working state, it should link the access point link with the user and then enter into normal-working state;

5) If the device receives Broken message, which indicates the link of the remote device is still in fault state, T2 will be recounted;

Service-network-faulty state: When a device enters into this state, it is indicated that the service network fault has been detected.

1) The device continues checking whether the service network is normal; if the service network is still faulty, the device will send Broken message every T3 to inform the remote device of the service network fault (regardless whether or not the remote device can receive the message);

2) The device continues checking whether the service network is normal; if there is no fault in the service network for a period of time T0, it indicates the service network has recovered to normal; in that case, the device will send Non_Broken message to the remote peer and return to normal-working state directly, and start a new detection.

Access-point-faulty state: when a device enters into this state, it is indicated that an access point fault at the local has been detected. In that case, it is required to try to recover the access point link periodically.

1) The device checks the service network state at the local; if the service network is detected as unavailable, the device will send Broken message and enter into service-network-faulty state; this step is optional;

2) T1 and T4 periods are alternated; during T1 (it shall at least ensure the time required for normal linking between the service device and the user), the device tries to link the access point link; if the linking is successful, the device will send Non_Broken control frame to the remote peer and then enter into normal-working state; otherwise it will disconnect the access point link again and enter into T4 stage; during T4, the service device sends Broken message to the remote peer every T3, to inform the remote peer of the network fault at the local; after T4 stage, the device will reenter into T1 stage;

3) If the device receives Broken control frame, which indicates the service network or the remote access point is faulty, T4 will be recounted;

4) If the device receives Non_Broken message, it is indicated that the remote network has recovered; in that case, the device at the local shall enter into T1 stage immediately and try to recover the network linking.

Figure 1:
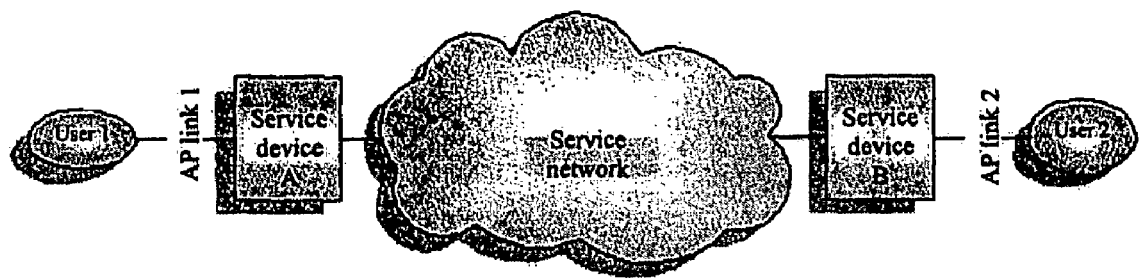
FIG. 1 is a schematic diagram of data interaction by user through a point-to-point access network.
Figure 9:
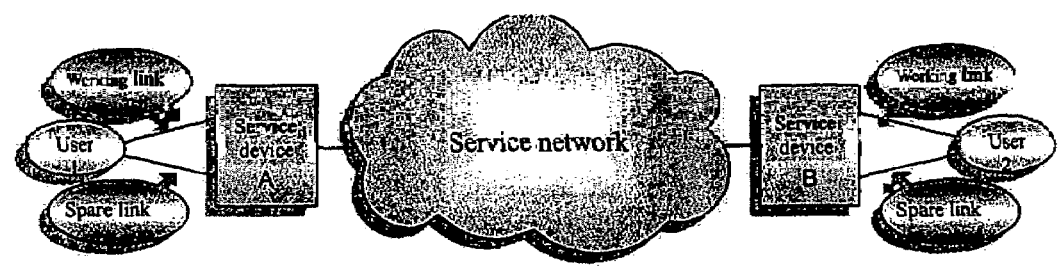
FIG. 9 shows a network structure to which the link state passing-through method as described in the present invention can be applied.
Figure 10:
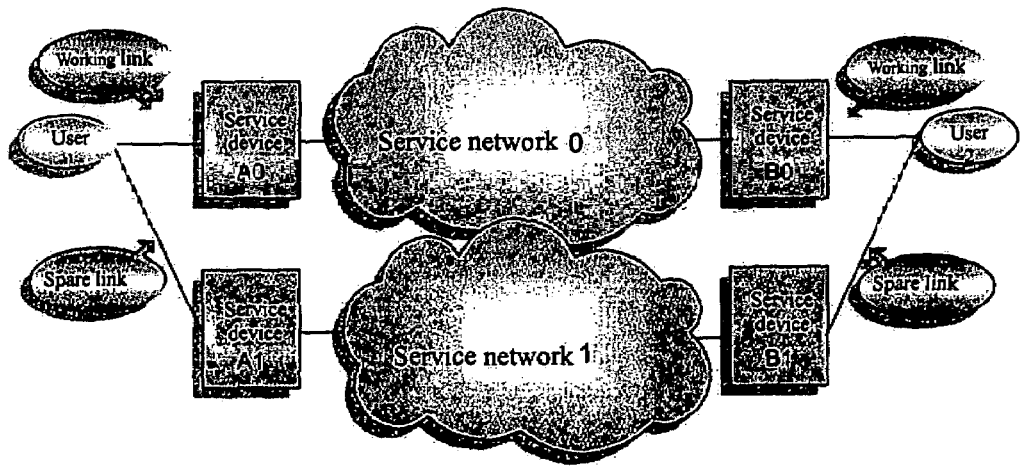
FIG. 10 shows another network structure to which the link state passing-through method as described in the present invention can be applied.

Though the present invention is described with reference to specific embodiments as above, it is understood that the present invention shall not be limited to those embodiments. For instance, in above embodiment, the link state passing-through technique is applied in the network structure shown in FIG. 1. However, that technique is also applicable to network structures in other forms. FIG. 9 and FIG. 10 show two network structures where the link passing-through technique described in the present invention can be applied. As shown in FIG. 9, the first type of network structure is: user 1 and user 2 can activate a service with two ports; said two ports may be one working and the other spare or serve as working/spare for each other. In that case, link state passing-through function can be applied to both ports. However, when the service network is faulty, the communication between user 1 and user 2 will still be disconnected. As shown in FIG. 10, the second type of network structure is: the working link and the spare link are in different networks, completely independent of each other. User 1 activates the service at service device A0 and service device A1, respectively; likewise, user 2 activates the service at service device B0 and service device B1. Under normal conditions, user 1 and user 2 communicate with each other through service network 0; in case of fault, user 1 and user 2 communicate with each other through service network 1. Such structure can ensure communication between the users even when service network 0 is faulty. Therefore, the scope of the present invention is only defined by the Claims, and any modification or transformation to the present invention can be made without departing from the spirit and scope of the present invention.

The invention claimed is:

1. A method for implementing link state passing-through in a network, comprising the following steps:
A. a service device detecting whether there is a link fault in the network;
B. in the case that there is a link fault, the service device transferring link-faulty information to a remote service device in a control frame via a service network;
C. in response to the received control frame containing the link-faulty information, the remote service device disconnecting a remote access point link with a remote user;
D. a user at the faulty side communicating with the remote user through a spare network for said network,
wherein
if said link fault is an access point link fault, the service device at the faulty side sends a control frame containing access-point-link-faulty information to the remote service device; when receiving said control frame containing the access-point-faulty information, said remote service device disconnects the remote access point link with the remote user; and then, the user at the faulty side communicates with the remote user through the spare network;
if said link fault is a service network fault, the service device at the faulty side sends a control frame containing service-network-faulty information to the remote service device and disconnects an access point link with the user at the faulty side; when receiving said control frame containing the service-network-faulty information, said remote service device disconnects the remote access point link with the remote user; and then the user at the faulty side communicates with the remote user through the spare network.

2. The method for implementing link state passing-through in a network as in claim 1, also comprising the following step:

E. when detecting the link fault is repaired, the service device sending a control frame containing link-fault-repaired information to the remote service device so as to switch the communication between the user and the remote user to said network.

3. The method for implementing link state passing-through in a network as in claim 2, further comprising the following steps:

when the remote service device receives the control frame containing the link-faulty information, the remote service device reporting a link fault event; if the remote access point link is normal, the remote service device entering into a waiting-for-recovery state; if the remote access point link is faulty, the remote service device sending a control frame containing link-faulty information to the service device periodically;

when the remote service device receives the control frame containing the link-fault-repaired information, the remote service device reporting a link fault disappearing event; if the remote access point link is normal, the remote service device entering into a normal-working state; if the remote access point link is faulty, the remote service device trying to recover the remote access point link.

4. The method for implementing link state passing-through in a network as in claim 3, wherein if the remote service device in the waiting-for-recovery state has not received the control frame containing the link-faulty information for a predefined time period, the remote service device recovers the remote access point link with the remote user and returns to the normal-working state actively.

5. The method for implementing link state passing-through in a network as in claim 2, wherein said step E comprises the following step:

detecting a link fault in a link is repaired only when the link is available for a predefined time period.

6. The method for implementing link state passing-through in a network as in claim 1, wherein said control frame contains at least network state information, which indicates whether there is a link fault.

7. The method for implementing link state passing-through in a network as in claim 6, wherein said control frame is an Ethernet frame, with said network state information filled into an operation code field of said Ethernet frame.

8. The method for implementing link state passing-through in a network as in claim 6, wherein said control frame is an encapsulation protocol control frame, with said network state information filled into a control field in said encapsulation protocol control frame.

9. The method for implementing link state passing-through in a network as in claim 6, wherein said control frame is a signal label byte, with said network state information filled in said signal label byte.

10. The method for implementing link state passing-through in a network as in claim 1, wherein said step A comprises the following step:

detecting there is a link fault in a link only when the link is unavailable for a predefined time period.

11. The method for implementing link state passing-through in a network as in claim 1, wherein a link fault is determined as a service network fault only after determining the protection function of said service network per se fails.

12. The method for implementing link state passing-through in a network as in claim 1, wherein in case the link fault is an access point link fault, the method also comprises the following steps for trying to recover the access point link periodically:

during a first predefined period, the service device trying to recover the access point link; if the access point link is recovered, the service device sending the control frame containing the link-fault-repaired information to the remote service device and then entering into a normal-working state; otherwise, when the first predefined period is over, the service device disconnecting the access point link with the user and entering into a second predefined period;

during the second predefined period, the service device sending the control frame containing the link-faulty information to the remote service device periodically and when the second predefined period is over, entering into the first predefined period.

13. The method for implementing link state passing-through in a network as in claim 1, wherein said step B comprises the following steps:

when the service device detects an access point link fault, the service device reporting a local access point link fault alarm; the service device stopping reporting when the service device detects the access point link fault disappears;

when the service device detects a service network fault, the service device reporting a service network fault alarm with an existing alarm in the service network or with a special alarm.

* * * * *

UNITED STATES PATENT AND TRADEMARK OFFICE
CERTIFICATE OF CORRECTION

PATENT NO. : 7,660,240 B2  Page 1 of 1
APPLICATION NO. : 10/535858
DATED : February 9, 2010
INVENTOR(S) : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1034 days.

Signed and Sealed this

Thirtieth Day of November, 2010

David J. Kappos
*Director of the United States Patent and Trademark Office*